(12) United States Patent  
Huang et al.

(10) Patent No.: US 11,915,443 B2
(45) Date of Patent: Feb. 27, 2024

(54) IMAGE PROCESSING METHOD AND APPARATUS

(71) Applicant: CONTEMPORARY AMPEREX TECHNOLOGY CO., LIMITED, Ningde (CN)

(72) Inventors: Qiangwei Huang, Ningde (CN); Guannan Jiang, Ningde (CN); Zhiyu Wang, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 18/303,971

(22) Filed: Apr. 20, 2023

(65) Prior Publication Data
US 2024/0005542 A1 Jan. 4, 2024

Related U.S. Application Data

(63) Continuation of application No. PCT/CN2022/102738, filed on Jun. 30, 2022.

(51) Int. Cl.
G06T 7/60 (2017.01)

(52) U.S. Cl.
CPC ...... *G06T 7/60* (2013.01); *G06T 2207/20044* (2013.01)

(58) Field of Classification Search
CPC .......... G06T 7/60; G06T 2207/20044
See application file for complete search history.

(56) References Cited

U.S. PATENT DOCUMENTS

2003/0021480 A1* 1/2003 Ishitsu .............. G06T 7/00 382/257
2018/0308230 A1 10/2018 Karube

FOREIGN PATENT DOCUMENTS

| CN | 104951788 A | 9/2015 |
| CN | 107507171 A | 12/2017 |
| CN | 109754378 A | 5/2019 |
| CN | 112712273 * | 4/2021 |
| CN | 114066752 A | 2/2022 |

OTHER PUBLICATIONS

Machine translation for CN 112712273 (Year: 2021).*
Machine translation for CN 109754378, IDS (Year: 2019).*
The World Intellectual Property Organization (WIPO) International Search Report for PCT/CN2022/102738 dated Dec. 19, 2022 6 pages(including translation).

* cited by examiner

Primary Examiner — Qian Yang
(74) Attorney, Agent, or Firm — ANOVA LAW GROUP, PLLC

(57) ABSTRACT

An image processing method includes searching for a next pixel of a skeleton branch of a target image based on an already-searched current pixel of the skeleton branch, and determining whether the skeleton branch is a burr branch based on a number of already-searched pixels of the skeleton branch.

20 Claims, 7 Drawing Sheets

100

Search for a next pixel of a skeleton branch of a target image based on an already-searched current pixel of the skeleton branch — 110

Determine, based on the number of already-searched pixels of the skeleton branch, whether the skeleton branch is a burr branch — 120

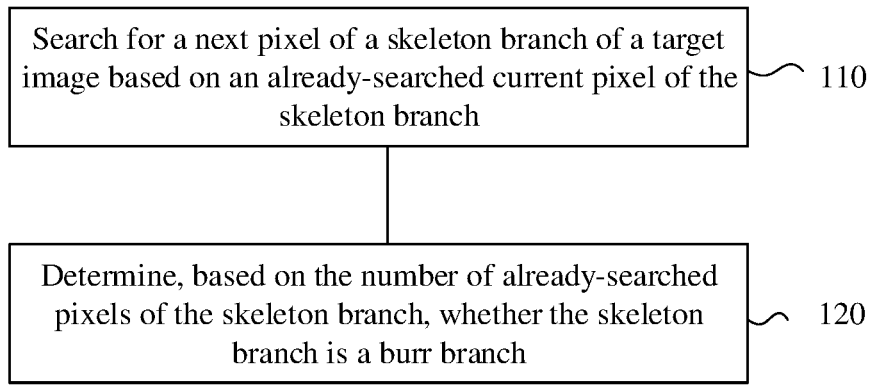
FIG. 1
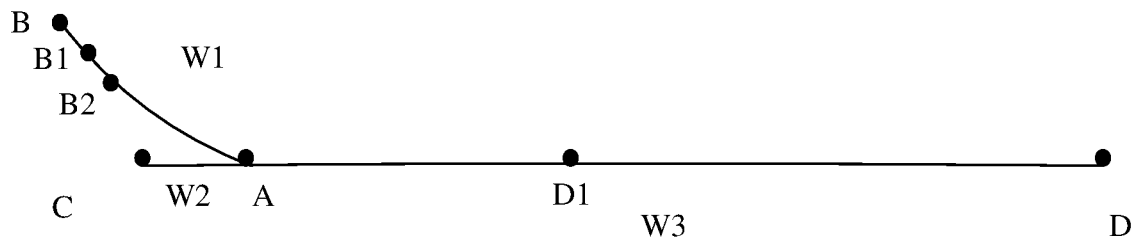
FIG. 2
| P9 | P2 | P3 |
| --- | --- | --- |
| P8 | P1 | P4 |
| P7 | P6 | P5 |
FIG. 3

(a)  (b)

(a)  (b)

(a)            (b)

(a)            (b)

(a)                  (b)

IMAGE PROCESSING METHOD AND APPARATUS

CROSS-REFERENCE TO RELATED APPLICATION

This application is a continuation of International Application No. PCT/CN2022/102738, filed on Jun. 30, 2022, the entire content of which is incorporated herein by reference.

TECHNICAL FIELD

This application relates to the image processing field, and in particular, to an image processing method and apparatus.

BACKGROUND

In the past, most image processing was implemented manually, and such processing manner was less efficient and more time-consuming, unable to produce a desired processing result. With the development of technologies, image processing is performed using computers in an increasing number of fields.

Computer-based image processing technologies are not mature at present, and it is difficult to take into account both accuracy and speed. Therefore, how to provide an image processing method and apparatus to take into account both the processing speed and accuracy is a technical problem to be urgently resolved.

SUMMARY

This application provides an image processing method and apparatus, so as to take into account both the processing speed and accuracy.

According to a first aspect, an image processing method is provided, including: searching for a next pixel of a skeleton branch of a target image based on an already-searched current pixel of the skeleton branch; and determining, based on the number of already-searched pixels of the skeleton branch, whether the skeleton branch is a burr branch.

The image processing method provided in this embodiment of this application includes: searching for a next pixel of a skeleton branch of a target image based on an already-searched current pixel of the skeleton branch; and determining, based on the number of already-searched pixels of the skeleton branch, whether the skeleton branch is a burr branch. Searching for the next pixel of the skeleton branch of the target image based on the already-searched current pixel of the skeleton branch means that the next pixel of the skeleton branch is related to the already-searched current pixel of the skeleton branch. That is, searching for the skeleton branch of the target image is performed along a specific searching path. The determining, based on the number of already-searched pixels of the skeleton branch, whether the skeleton branch is a burr branch means that: in some cases, whether the skeleton branch is a burr branch is determined, with no need to search for all pixels. As compared to determining a burr branch by sequentially traversing pixels one by one, in this application, the burr branch can be determined based on the number of pixels searched along a specific search path. Therefore, both the processing speed and accuracy can be taken into account in the technical solution of this application.

In a possible implementation, before the searching for a next pixel of a skeleton branch of a target image based on an already-searched current pixel of the skeleton branch, the method further includes: determining an end point and a branch point in the target image, where the end point and the branch point are used for searching for the skeleton branch. This facilitates subsequent searching operations to be performed based on statuses of end points and branch points in the image.

In a possible implementation, the searching for a next pixel of a skeleton branch of a target image based on an already-searched current pixel of the skeleton branch includes: using an end point in the target image as an anchor point, and sequentially searching for a next pixel of the skeleton branch based on an already-searched current pixel of the skeleton branch corresponding to the end point. In this way, a skeleton branch corresponding to each end point is processed one by one by using the end point as an anchor point, and the number of and types of skeleton branches can be accurately determined. This avoids misjudgment and misdeletion of a burr branch resulting from classification of different skeleton branches into one skeleton branch, and helps improve accuracy of determining a burr branch.

In a possible implementation, the determining, based on the number of already-searched pixels of the skeleton branch, whether the skeleton branch is a burr branch includes: in a case that the number of already-searched pixels of the skeleton branch reaches a first threshold, determining that the skeleton branch is not a burr branch. In this way, whether the skeleton branch is not a burr branch can be determined, with no need to search for all pixels of the skeleton branch, thereby helping improve the processing speed and reduce computing resources.

In a possible implementation, the determining, based on the number of already-searched pixels of the skeleton branch, whether the skeleton branch is a burr branch includes: in a case that the number of already-searched pixels of the skeleton branch does not reach the first threshold and the already-searched current pixel of the skeleton branch is a branch point, determining that the skeleton branch is a burr branch. In this way, the burr branch can be quickly determined, and whether the skeleton branch is a burr branch can be determined, with no need to search for all pixels in the target image, thereby helping improve the processing speed and reduce computing resources.

In a possible implementation, the method further includes: stopping searching in a case that the number of already-searched pixels of the skeleton branch reaches the first threshold or that the already-searched current pixel of the skeleton branch is a branch point. In this way, the number of already-searched pixels of the skeleton branch reaching the first threshold or the already-searched current pixel of the skeleton branch being a branch point may be used as a trigger condition for stopping searching, thereby facilitating subsequent operations.

In a possible implementation, a value of a foreground pixel in the target image corresponds to 1, and a value of a background pixel corresponds to 0. In this way, a value of a pixel of the skeleton branch in the target image corresponds to 1, which facilitates search for pixels of the skeleton branch.

In a possible implementation, the searching for a next pixel of a skeleton branch of a target image based on an already-searched current pixel of the skeleton branch includes: converting a value of the already-searched current pixel to 0; and in a case that only one foreground pixel is present in eight neighboring pixels of the already-searched current pixel, determining that the one foreground pixel is a next pixel of the skeleton branch.

In this implementation, the value of the already-searched current pixel is converted to 0. In this way, during search for a next pixel based on the already-searched current pixel, the already-searched pixel cannot be found again, and searching is performed along a specific search path, that is, along a skeleton of the skeleton branch. In the case that only one foreground pixel is present in the eight neighboring pixels of the already-searched current pixel, the one foreground pixel is determined to be a next pixel of the skeleton branch, so as to ensure that the one foreground pixel is a pixel on the skeleton branch.

In a possible implementation, the method further includes: in a case that more than one foreground pixel is present in the eight neighboring pixels of the already-searched current pixel, determining that the already-searched current pixel is a branch point. This helps determine, based on whether the current pixel is a branch point, whether the skeleton branch is a burr branch.

In a possible implementation, the method further includes: recording the already-searched current pixel, where the number of recorded pixels is the number of already-searched pixels of the skeleton branch. This helps determine a length of the skeleton branch based on the number of recorded pixels, so as to determine whether the skeleton branch is a burr branch.

In a possible implementation, the recording the already-searched current pixel includes: storing position information of the already-searched current pixel into a memory. This helps obtain a graph of the skeleton branch based on the position information, and also facilitates obtaining from the memory when needed during subsequent use.

In a possible implementation, the method further includes: in a case that the skeleton branch is determined to be a burr branch, converting a value of an already-searched current branch point to 1; or in a case that the skeleton branch is determined not to be a burr branch, converting values of all already-searched pixels of the skeleton branch to 1.

In this implementation, in the case that the skeleton branch is determined to be a burr branch, the value of the already-searched current branch point is converted to 1, so as to ensure continuity between other skeleton branches connected by this branch point to avoid a discontinuous pattern in the target image. In this implementation, in the case that the skeleton branch is determined not to be a burr branch, the values of all the already-searched pixels of the skeleton branch are converted to 1, so as to restore the graph of the skeleton branch to an original state.

In a possible implementation, the determining an end point and a branch point in the target image includes: based on values of the eight neighboring pixels of the current pixel in the target image, determining that the current pixel in the target image is an end point or a branch point. The method is simple and easy, facilitating determining of an end point or a branch point.

In a possible implementation, the determining that the current pixel in the target image is an end point includes: in a case that a sum of the values of the eight neighboring pixels of the current pixel in the target image is 1, determining that the current pixel is an end point. This facilitates determining of an end point in the target image.

In a possible implementation, the determining that the current pixel in the target image is a branch point includes: in a case that a sum of the values of the eight neighboring pixels of the current pixel in the target image is greater than or equal to 3 and values of at least three of the eight neighboring pixels each are less than or greater than a value of a previous neighboring pixel in a clockwise or counter-clockwise direction by 1, determining that the current pixel is a branch point. In this way, the branch point in the target image can be accurately determined, so as to avoid incorrectly determining a non-branch point as a branch point.

In a possible implementation, the method further includes: in a case that the number of branch points is 0, determining, based on the number of foreground pixels of the skeleton branch, whether the skeleton branch is a burr branch. This helps further improve a processing speed in the method and can also avoid missing deletion of the burr branch.

In a possible implementation, the determining, based on the number of foreground pixels of the skeleton branch, whether the skeleton branch is a burr branch includes: in a case that the number of foreground pixels of the skeleton branch is less than the first threshold, determining that the skeleton branch is a burr branch; or in a case that the number of foreground pixels of the skeleton branch is not less than the first threshold, determining that the skeleton branch is not a burr branch. In this way, setting of the first threshold helps determine, based on a relationship between the number of foreground pixels of the skeleton branch and the first threshold, whether the skeleton branch is a burr branch.

In a possible implementation, the method further includes: obtaining an input image, where a value of a foreground pixel of the input image corresponds to 1, and a value of a background pixel corresponds to 0; and extracting a connected component of the input image to obtain at least one target image, where each of the target images includes one connected component of the input image. In this way, each target image corresponds to one connected component, and each target image is processed separately, which helps improve the processing speed in the method.

In a possible implementation, a width of the skeleton branch is a single-pixel width. In this way, it can be ensured that during search for a next pixel of the skeleton branch, only one neighboring pixel is present along a direction of the skeleton, so as to ensure uniqueness of a skeleton path.

According to a second aspect, an image processing apparatus is provided, including: a processing module, where the processing module is configured to search for a next pixel of a skeleton branch of a target image based on an already-searched current pixel of the skeleton branch, and determine, based on the number of already-searched pixels of the skeleton branch, whether the skeleton branch is a burr branch.

According to a third aspect, an image processing apparatus is provided, including: a memory configured to store computer-executable instructions, and a processor configured to access the memory and execute the computer-executable instructions, so as to perform operations in the method according to the first aspect or any one implementation of the first aspect.

According to a fourth aspect, a storage medium is provided and configured to store a computer program, where when the computer program is executed by a computing device, the computing device implements the method according to the first aspect or any one implementation of the first aspect.

The image processing method provided in the embodiments of this application includes: searching for a next pixel of a skeleton branch of a target image based on an already-searched current pixel of the skeleton branch; and determining, based on the number of already-searched pixels of the skeleton branch, whether the skeleton branch is a burr branch. Searching for the next pixel of the skeleton branch of the target image based on the already-searched current pixel of the skeleton branch means that the next pixel of the skeleton branch is related to the already-searched current pixel of the skeleton branch. That is, searching for the skeleton branch of the target image is performed along a specific searching path. The determining, based on the number of already-searched pixels of the skeleton branch, whether the skeleton branch is a burr branch means that: in some cases, whether the skeleton branch is a burr branch is determined, with no need to search for all pixels. As compared to determining a burr branch by sequentially traversing pixels one by one, in this application, the burr branch can be determined based on the number of pixels searched along a specific search path. Therefore, both the processing speed and accuracy can be taken into account in the technical solutions of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

FIG. 1 illustrates an image processing method according to an embodiment of this application;

FIG. 2 is a schematic diagram of a target image according to an embodiment of this application;

FIG. 3 is a schematic diagram of neighboring pixels according to an embodiment of this application;

Figure 4:
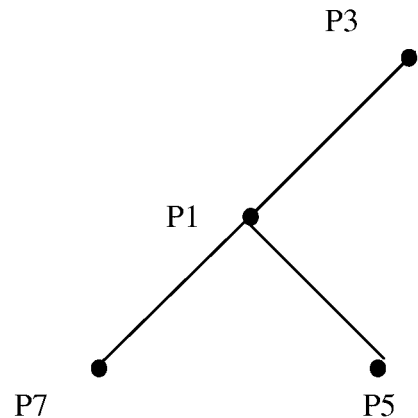
FIG. 4 is a schematic diagram of neighboring pixels according to an embodiment of this application.

The accompanying drawings are not necessarily drawn to scale.

DETAILED DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

The term "and/or" in this application describes only an association relationship for describing associated objects and represents that three relationships may exist. For example, A and/or B may represent the following three cases: A alone, both A and B, and B alone. In addition, the character "/" in this application generally indicates an "or" relationship between the associated objects.

In the past, most image processing was implemented manually, and such processing manner was less efficient and more time-consuming, unable to produce a desired processing result. With the development of technologies, image processing is performed using computers in an increasing number of fields. As compared to manual processing, accuracy and speed of computer-based image processing have been significantly improved. Therefore, computer-based image processing is increasingly used in some fields of burr recognition and removal. However, in most existing image burr processing methods, sequentially traversing pixels of an image to check for burrs consumes a lot of time, features a relatively low processing speed, and may cause accidental deletion.

In view of this, the embodiments of this application provide an image processing method, including: searching for a next pixel of a skeleton branch of a target image based on an already-searched current pixel of the skeleton branch; and determining, based on the number of already-searched pixels of the skeleton branch, whether the skeleton branch is a burr branch. Searching for the next pixel of the skeleton branch of the target image based on the already-searched current pixel of the skeleton branch means that the next pixel of the skeleton branch is related to the already-searched current pixel of the skeleton branch. That is, searching for the skeleton branch of the target image is performed along a specific searching path. The determining, based on the number of already-searched pixels of the skeleton branch, whether the skeleton branch is a burr branch means that: in some cases, whether the skeleton branch is a burr branch is determined, with no need to search for all pixels. As compared to determining a burr branch by sequentially traversing pixels one by one, in this application, the burr branch can be determined based on the number of pixels searched along a specific search path. Therefore, both the processing speed and accuracy can be taken into account in the technical solutions of this application.

FIG. 1 illustrates an image processing method according to an embodiment of this application. The method 100 specifically includes following step 110 and step 120.

Step 110: Search for a next pixel of a skeleton branch of a target image based on an already-searched current pixel of the skeleton branch.

In the image processing field, noise generally occurs in images captured by a camera or in images obtained through image synthesis, processing, and other steps. Such noise causes burrs protruding from or recessed from edges of an image, and the burrs bring some inconvenience to subsequent image applications, for example, in the industrial field, leading to accidental deletion or missing deletion of some defects.

A skeleton of the target image may be a graph formed by foreground pixels in the target image, and the skeleton branch may be a branch graph resulting from division of the skeleton into several branches due to presence of branch points in the graph. For example, if one target image includes one skeleton, when there is no branch point in the skeleton, the skeleton is a skeleton branch; or when there is a branch point in the skeleton, the skeleton is divided into at least three skeleton branches.

A burr branch is generated due to reasons such as noise, and the skeleton branch may include a burr branch. Under some specific conditions, the skeleton branch may be determined to be a burr branch.

FIG. 2 is a schematic diagram of a target image according to an embodiment of this application. As shown in FIG. 2, the target image may include a plurality of skeleton branches. For example, the target image includes a first skeleton branch W1, a second skeleton branch W2, and a third skeleton branch W3.

In step 110, for example, for the first skeleton branch W1, a point B1 is an already-searched current pixel, and searching for a next pixel B2 of the first skeleton branch W1 is performed based on the point B1. In other words, the to-be-searched next pixel of the skeleton branch is related to the already-searched current pixel of the skeleton branch, that is, the skeleton branch of the target image is searched along a specific search path. As compared to sequentially traversing pixels one by one, this method helps improve the processing speed and can also avoid misjudgment of a skeleton branch.

Step 120: Determine, based on the number of already-searched pixels of the skeleton branch, whether the skeleton branch is a burr branch.

For example, in a case that the number of already-searched pixels of the skeleton branch reaches a preset threshold, the skeleton branch is determined not to be a burr branch. Optionally, in step 120, in some cases, whether a specific skeleton branch is a burr branch can be determined, with no need to search for all pixels of the skeleton branch. In this way, as compared to searching for all the pixels in the target image, this method can reduce the search amount to some extent, and helps reduce computing resources.

This embodiment of this application provides an image processing method, including: searching for a next pixel of a skeleton branch of a target image based on an already-searched current pixel of the skeleton branch; and determining, based on the number of already-searched pixels of the skeleton branch, whether the skeleton branch is a burr branch. Searching for the next pixel of the skeleton branch of the target image based on the already-searched current pixel of the skeleton branch means that the next pixel of the skeleton branch is related to the already-searched current pixel of the skeleton branch. That is, searching for the skeleton branch of the target image is performed along a specific searching path. The determining, based on the number of already-searched pixels of the skeleton branch, whether the skeleton branch is a burr branch means that: in some cases, whether the skeleton branch is a burr branch is determined, with no need to search for all pixels. As compared to determining a burr branch by sequentially traversing pixels one by one, in this application, the burr branch can be determined based on the number of pixels searched along a specific search path. Therefore, both the processing speed and accuracy can be taken into account in the technical solution of this application.

Optionally, in an embodiment of this application, before step 110, the method 100 further includes: determining an end point and a branch point in the target image, where the end point and the branch point are used for searching for the skeleton branch.

The branch point may be an intersection point of a plurality of skeleton branches in the target image, for example, a point A in FIG. 2. The end point may be a starting point of a skeleton branch in the target image, for example, a point B, a point C, and a point D in FIG. 2, where the point B is an end point of the first skeleton branch W1, the point C is an end point of the second skeleton branch W2, and the point D is an end point of the third skeleton branch W3.

The determining an end point and a branch point in the target image may include: determining the number of and/or positions of end points and branch points in the target image.

Determining the end point and branch point in the target image before step 110 facilitates subsequent searching operations to be performed based on statuses of end points and branch points in the image.

Optionally, in an embodiment of this application, in step 110, an end point in the target image is used as an anchor point, and searching for a next pixel of a skeleton branch corresponding to the end point is sequentially performed based on an already-searched current pixel of the skeleton branch.

In step 110, in a case that the number of branch points is greater than 0, the end point in the target image is used as an anchor point, and searching for a next pixel of a skeleton branch corresponding to the end point is sequentially performed based on an already-searched current pixel of the skeleton branch.

Optionally, the anchor point is an already-searched current pixel. Using the end point in the target image as the anchor point may be using the end point in the target image as a starting point and performing searching starting from the end point.

Searching for a next pixel of the skeleton branch based on the already-searched current pixel of the skeleton branch corresponding to the end point may include the following specific method. For example, as shown in FIG. 2, for the first skeleton branch W1 of the target image, the end point B is used as a starting point, that is, the end point B is used as an already-searched current pixel in the first skeleton branch W1, and searching for a next pixel B1 of the first skeleton branch W1 is performed based on the end point B. After B1 is searched successfully, B1 is used as an already-searched current pixel, and searching for a next pixel B2 of the first skeleton branch W1 is then performed based on B1; . . . ; and searching for a next pixel is sequentially performed on the first skeleton branch W1. The next pixel may be a neighboring pixel of the already-searched current pixel, for example, the next pixel is one of eight neighboring pixels of the already-searched current pixel.

Optionally, a search step, that is, a distance between the next pixel and the already-searched current pixel may be specifically set according to actual requirements, so as to take into account both the search speed and search accuracy.

Sequentially searching for a next pixel of the skeleton branch based on the already-searched current pixel of the skeleton branch corresponding to the end point may include the following specific method. For example, as shown in FIG. 2, searching is sequentially performed on the first skeleton branch W1, the second skeleton branch W2, and the third skeleton branch W3, that is, searching is performed on a skeleton branch corresponding to each end point in the target image. However, a searching order for each skeleton branch is not specifically limited.

In some solutions of the related art, skeleton branches in the target image are classified by using the following method. As shown in FIG. 2, the pixels in the target image are traversed sequentially from left to right, and then from top to bottom, that is, starting from the top of the target image, traversing is sequentially performed in the 1st row, the 2nd row, . . . , until the last row. In this method, if the current pixel is a foreground point, a label is assigned to a neighboring foreground pixel, and if the current pixel is a foreground point and an end point, a new label is assigned to the pixel. According to this method, a label L1 is assigned to the first skeleton branch W1, and another label L2 is assigned to the second skeleton branch W2 and the third skeleton branch W3, where L1 is different from L2. In this case, on the one hand, it may lead to incorrect calculation of the number of skeleton branches; on the other hand, the first skeleton branch W1 may be considered as a burr branch and deleted, while the second skeleton branch W2 is more likely to be a burr branch in practical applications. Therefore, the method in the related art may cause counting errors of skeleton branches and misjudgment and misdeletion of burr branches.

In this embodiment, the end point in the target image is used as an anchor point, searching for a next pixel of the skeleton branch corresponding to the end point is sequentially performed based on the already-searched current pixel of the skeleton branch. In this way, the number of and types of skeleton branches can be accurately determined, so as to avoid misjudgment and misdeletion of burr branches due to classification of different skeleton branches into one skeleton branch, thereby helping improve accuracy of determining burr branches.

Optionally, in an embodiment of this application, in step 120, in a case that the number of already-searched pixels of the skeleton branch reaches a first threshold, the skeleton branch is determined not to be a burr branch.

Optionally, the first threshold may be specifically set according to actual requirements, for example, being set based on empirical values in specific application fields.

Optionally, referring to FIG. 2, for the third skeleton branch W3, when the number of already-searched pixels of the third skeleton branch W3 reaches the first threshold, the third skeleton branch W3 is determined not to be a burr branch.

In this embodiment, whether the skeleton branch is not a burr branch can be determined without searching all pixels of the skeleton branch, thereby helping improve the processing speed and reduce computing resources.

Optionally, in an embodiment of this application, in step 120, in a case that the number of already-searched pixels of the skeleton branch does not reach the first threshold and the already-searched current pixel of the skeleton branch is a branch point, the skeleton branch is determined to be a burr branch.

For example, referring to FIG. 2, for the second skeleton branch W2, with the end point C being used as a starting point and an already-searched current pixel of the second skeleton branch W2, searching for a next pixel of the second skeleton branch W2 is performed, . . . , until an already-searched current pixel being the branch point A. In this case, the number of already-searched pixels of the second skeleton branch W2 does not reach the first threshold, and therefore, the second skeleton branch W2 may be determined to be a burr branch.

In this embodiment, under the premise that the number of already-searched pixels of the skeleton branch does not reach the first threshold, if the already-searched current pixel is a branch point, the skeleton branch may be determined to be a burr branch. In this way, the burr branch can be quickly determined, and whether the skeleton branch is a burr branch can be determined, with no need to search for all pixels in the target image, thereby helping improve the processing speed and reduce computing resources.

Optionally, in an embodiment of this application, in a case that the number of already-searched pixels of the skeleton branch reaches the first threshold or that the already-searched current pixel of the skeleton branch is a branch point, searching is stopped.

Optionally, referring to FIG. 2, for the third skeleton branch W3, when the number of already-searched pixels of the third skeleton branch W3 reaches the first threshold, searching is stopped. For example, when the point D1 is used as an already-searched current pixel and the number of already-searched pixels of the third skeleton branch W3 also reaches the first threshold, searching is stopped. In this case, searching does not need to be performed between the point D1 of the third skeleton branch W3 and the point A. In other words, searching on the third skeleton branch W3 is terminated; therefore, searching on other skeleton branches such as the first skeleton branch W1 and the second skeleton branch W2 may be performed, or searching in the entire target image is terminated.

Optionally, referring to FIG. 2, for the second skeleton branch W2, when the already-searched current pixel is the branch point A, searching is stopped. In other words, searching on the second skeleton branch W2 is terminated in this case; therefore, searching on other skeleton branches may be performed, or searching in the entire target image is terminated.

Optionally, terminating searching in the entire target image includes: terminating searching in the entire target image in a case that searching on all skeleton branches of the target image is stopped.

In this embodiment, the number of already-searched pixels of the skeleton branch reaching the first threshold or the already-searched current pixel of the skeleton branch being a branch point may be used as a trigger condition for stopping searching, thereby facilitating subsequent operations.

Optionally, in an embodiment of this application, a value of a foreground pixel in the target image corresponds to 1, and a value of a background pixel corresponds to 0. In this way, a value of a pixel of the skeleton branch in the target image is 1, which facilitates search for pixels of the skeleton branch.

The value of the foreground pixel being corresponding to 1 may means that a label value of the foreground pixel is 1. The value of the background pixel being corresponding to 0 may means that a label value of the background pixel is 0. For example, the value of the foreground pixel in the target image is any one of 0 to 255, and the value of the background pixel is any one of 0 to 255. Through presetting processing, values of all foreground pixels may be labeled as 1, and values of all background pixels are labeled as 0.

Optionally, the value of the foreground pixel being corresponding to 1 may mean that the pixel value of the foreground pixel itself is 1. The value of the background pixel being corresponding to 0 may mean that the pixel value of the background pixel itself is 0.

The value of the foreground pixel in the target image is different from the value of the background pixel. The value of the foreground pixel in the target image may alternatively be greater than or less than the value of the background pixel, which may be specifically set according to actual requirements.

Optionally, in an embodiment of this application, a value of the already-searched current pixel is converted to 0; and in a case that only one foreground pixel is present in eight neighboring pixels of the already-searched current pixel, the one foreground pixel is determined to be a next pixel of the skeleton branch.

The value of the already-searched current pixel is converted to 0, for example, for the first skeleton branch W1, the pixel B1 is an already-searched current pixel and has a pixel value of 1. Before search for the next pixel B2 of the first skeleton branch W1 based on the pixel B1, the pixel value of the pixel B1 is converted to 0. In this way, during searching for the pixel B2 based on the pixel B1, the already-searched current pixel B1 may not be found again.

In a case that only one foreground pixel is present in eight neighboring pixels of the already-searched current pixel, the one foreground pixel is determined to be a next pixel of the skeleton branch. For example, for the first skeleton branch W1, the pixel B1 is an already-searched current pixel and the pixel value is converted to 0, and only one foreground pixel B2 is present in eight neighboring pixels of B1. In this case, B2 may be determined to be a next pixel of the first skeleton branch W1. If two or more foreground pixels are present in the eight neighboring pixels of B1, these foreground pixels do not belong to the first skeleton branch W1, and cannot be determined as a next pixel of the first skeleton branch W1.

In this embodiment, the value of the already-searched current pixel is converted to 0. In this way, during search for a next pixel based on the already-searched current pixel, the already-searched pixel cannot be found again, and searching is performed along a specific search path, that is, along a skeleton of the skeleton branch. In the case that only one foreground pixel is present in the eight neighboring pixels of the already-searched current pixel, the one foreground pixel is determined to be a next pixel of the skeleton branch, so as to ensure that the one foreground pixel is a pixel on the skeleton branch.

Optionally, in an embodiment of this application, in a case that more than one foreground pixel is present in the eight neighboring pixels of the already-searched current pixel, the already-searched current pixel is determined to be a branch point.

For example, for the second skeleton branch W2, when the point A is an already-searched current pixel of the second skeleton branch W2 and the pixel value of the point A is converted to 0, two foreground pixels are present in the eight neighboring domains of the point A. In this case, the point A may be determined to be a branch point.

In this embodiment, determining that the already-searched current pixel is a branch point may be performing searching along a specific search path and determining the already-searched current pixel to be a branch point during searching along the specific search path.

Optionally, the method for determining that the already-searched current pixel is a branch point is different from the method for determining a branch point by traversing row by row.

Optionally, in other embodiments, three, four, or even more pixels may be present in the eight neighboring domains of the already-searched current pixel. In this case, the already-searched current pixel may be determined to be a branch point.

In this embodiment, this helps determine, based on whether the current pixel is a branch point, whether the skeleton branch is a burr branch.

Optionally, in an embodiment of this application, the already-searched current pixel may be further recorded, where the number of recorded pixels is the number of already-searched pixels of the skeleton branch. This helps determine a length of the skeleton branch based on the number of recorded pixels, so as to determine whether the skeleton branch is a burr branch.

Optionally, in an embodiment of this application, position information of the already-searched current pixel may be stored into a memory. This helps obtain a graph of the skeleton branch based on the position information, and also facilitates obtaining from the memory when needed during subsequent use.

Optionally, the memory is a stack container.

Optionally, in an embodiment of this application, in a case that the skeleton branch is determined to be a burr branch, a value of an already-searched current branch point is converted to 1; or, in a case that the skeleton branch is determined not to be a burr branch, values of all already-searched pixels of the skeleton branch are converted to 1.

In this embodiment, in the case that the skeleton branch is determined to be a burr branch, the value of the already-searched current branch point is converted to 1, so as to ensure continuity between other skeleton branches connected by this branch point to avoid a discontinuous pattern in the target image. For example, during searching on the second skeleton branch W2, after the point A is determined to be a branch point, if the value of the point A is not converted to 1, the first skeleton branch W1 may be consequently not connected to the third skeleton branch W3. This may lead to incorrect counting of skeleton branches.

In this embodiment, in the case that the skeleton branch is determined not to be a burr branch, the values of all the already-searched pixels of the skeleton branch are converted to 1, so as to restore the graph of the skeleton branch to an original state.

Optionally, in an embodiment of this application, based on values of the eight neighboring pixels of the current pixel in the target image, it may be determined that the current pixel in the target image is an end point or a branch point. The method is simple and easy, facilitating determining of an end point or a branch point.

In this embodiment, a branch point and an end point in the target image can be determined in a manner of traversing row by row and pixel by pixel. For example, traversing is performed from top to bottom and from left to right to find or determine a branch point and an end point. During such traversing, the end point and branch point can be identified.

In this embodiment, determining an end point and a branch point in the target image may include: determining presence of a branch point in the target image in a case that the number of end points in the target image is greater than 2; or determining absence of a branch point in the target image in a case that the number of end points is 2.

Optionally, in an embodiment of this application, in a case that a sum of the values of the eight neighboring pixels of the current pixel in the target image is 1, the current pixel is determined to be an end point.

FIG. 3 is a schematic diagram of neighboring pixels according to an embodiment of this application. As shown in FIG. 3, a point P1 represents a current pixel, and P2, P3, P4, P5, P6, P7, P8, and P9 are eight neighboring pixels of P1. When a sum of pixel values of the eight neighboring pixels of P1 is equal to 1, the current pixel P1 may be determined to be an end point.

The method in this embodiment facilitates determining of an end point in the target image.

Optionally, in an embodiment of this application, in a case that a sum of the values of the eight neighboring pixels of the current pixel in the target image is greater than or equal to 3 and values of at least three of the eight neighboring pixels each are less than or greater than a value of a previous neighboring pixel in a clockwise or counterclockwise direction by 1, the current pixel is determined to be a branch point.

FIG. 4 is a schematic diagram of neighboring pixels according to an embodiment of this application. (a) of FIG. 4 is a schematic diagram of values of eight neighboring pixels of a current pixel, and (b) of FIG. 4 is a schematic diagram of a skeleton branch in which the current pixel is located. As shown in FIG. 3 and FIG. 4, pixel values of P3, P5, and P7 are 1, and pixel values of P1, P2, P4, P6, P8, and P9 are 0. A sum of the values of the eight neighboring pixels of the current pixel P1 is 3, and in a clockwise direction, the pixel value of P4 is less than the pixel value of P3 by 1, the pixel value of P6 is less than the pixel value of P5 by 1, and the pixel value of P8 is less than the pixel value of P7 by 1. That is, values of three neighboring pixels each are less than a value of a previous neighboring pixel in the clockwise direction by 1. As shown in FIG. 4, the current pixel P1 may be determined to be a branch point.

Figure 5:
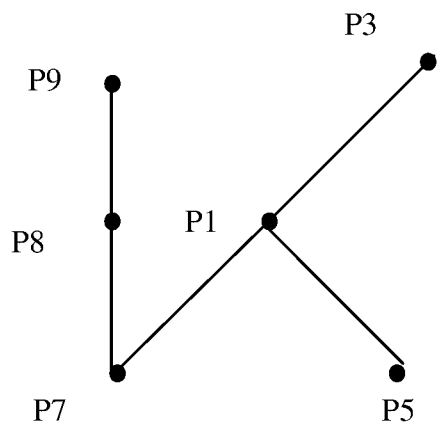
FIG. 5 is a schematic diagram of neighboring pixels according to an embodiment of this application.

FIG. 5 is a schematic diagram of neighboring pixels according to an embodiment of this application. (a) of FIG. 5 is a schematic diagram of values of eight neighboring pixels of a current pixel, and (b) of FIG. 5 is a schematic diagram of a skeleton branch in which the current pixel is located. As shown in FIG. 3 and FIG. 4, pixel values of P3, P5, P7, P8, and P9 are 1, and pixel values of P1, P2, P4, and P6 are 0. A sum of the values of the eight neighboring pixels of the current pixel P1 is 5, and in a clockwise direction, the pixel value of P4 is less than the pixel value of P3 by 1, the pixel value of P6 is less than the pixel value of P5 by 1, and the pixel value of P2 is less than the pixel value of P9 by 1. That is, values of three neighboring pixels each are less than a value of a previous neighboring pixel in the clockwise direction by 1. As shown in FIG. 5, the current pixel P1 may be determined to be a branch point.

It should be noted that, in a case that the sum of the values of the eight neighboring pixels of the current pixel in the target image is greater than or equal to 3, if values of at least three neighboring pixels each are less than or greater than a value of a previous neighboring pixel in the clockwise direction by 1, or if values of at least three neighboring pixels each are less than or greater than a value of a previous neighboring pixel in the counterclockwise direction by 1, the current pixel may be determined to be a branch point.

Figure 6:
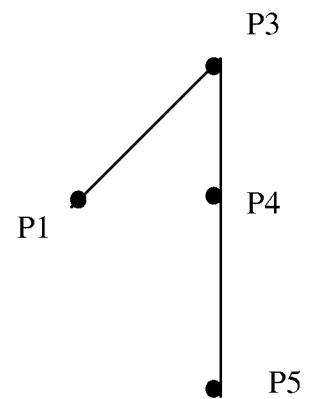
FIG. 6 to FIG. 8 each are a schematic diagram of neighboring pixels according to an embodiment of this application.
Figure 7:
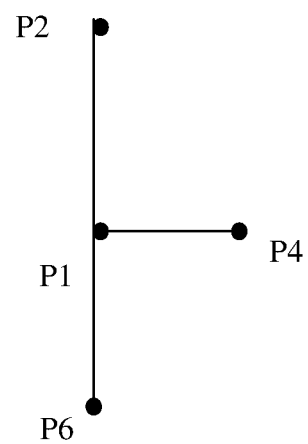
Figure 8:
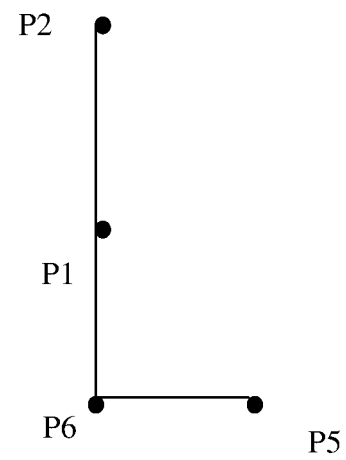

FIG. 6 to FIG. 8 are schematic diagrams of neighborhood pixels according to an embodiment of this application. (a)s of FIG. 6 to FIG. 8 each are a schematic diagram of values of eight neighboring pixels of a current pixel, and a sum of values of eight neighboring pixels of a current pixel P1 is 3. (b)s of FIG. 6 to FIG. 8 each are a schematic diagram of a skeleton branch in which the current pixel is located. As shown in (b)s of FIG. 6 to FIG. 8, because values of at least three of the eight neighboring pixels each are less than or greater than a value of a previous neighboring pixel in a clockwise or counterclockwise direction by 1, the current pixel P1 cannot be determined to be a branch point.

In this embodiment, in a case that a sum of the values of the eight neighboring pixels of the current pixel in the target image is greater than or equal to 3 and values of at least three of the eight neighboring pixels each are less than or greater than a value of a previous neighboring pixel in the clockwise or counterclockwise direction by 1, the current pixel is determined to be a branch point. In this way, the branch point in the target image can be accurately determined, so as to avoid incorrectly determining a non-branch point as a branch point.

Optionally, in an embodiment of this application, in a case that the number of branch points is 0, whether the skeleton branch is a burr branch is determined based on the number of foreground pixels of the skeleton branch.

In this embodiment, in the case that the number of branch points is 0, whether the skeleton branch is a burr branch is determined based on the number of foreground pixels of the skeleton branch, so as to prevent a skeleton branch without branch point from being determined as a non-burr branch and further leading to missing deletion of the burr branch. In addition, in the case that the number of branch points is 0, the number of foreground pixels of the skeleton branch being directly determined to determine whether the skeleton branch is a burr branch helps improve the processing speed in the method.

Optionally, in an embodiment of this application, in the case that the number of branch points is 0, if the number of foreground pixels of the skeleton branch is less than the first threshold, the skeleton branch is determined to be a burr branch; or if the number of foreground pixels of the skeleton branch is not less than the first threshold, the skeleton branch is determined not to be a burr branch. In this way, setting of the first threshold helps determine, based on a relationship between the number of foreground pixels of the skeleton branch and the first threshold, whether the skeleton branch is a burr branch.

Figure 9:
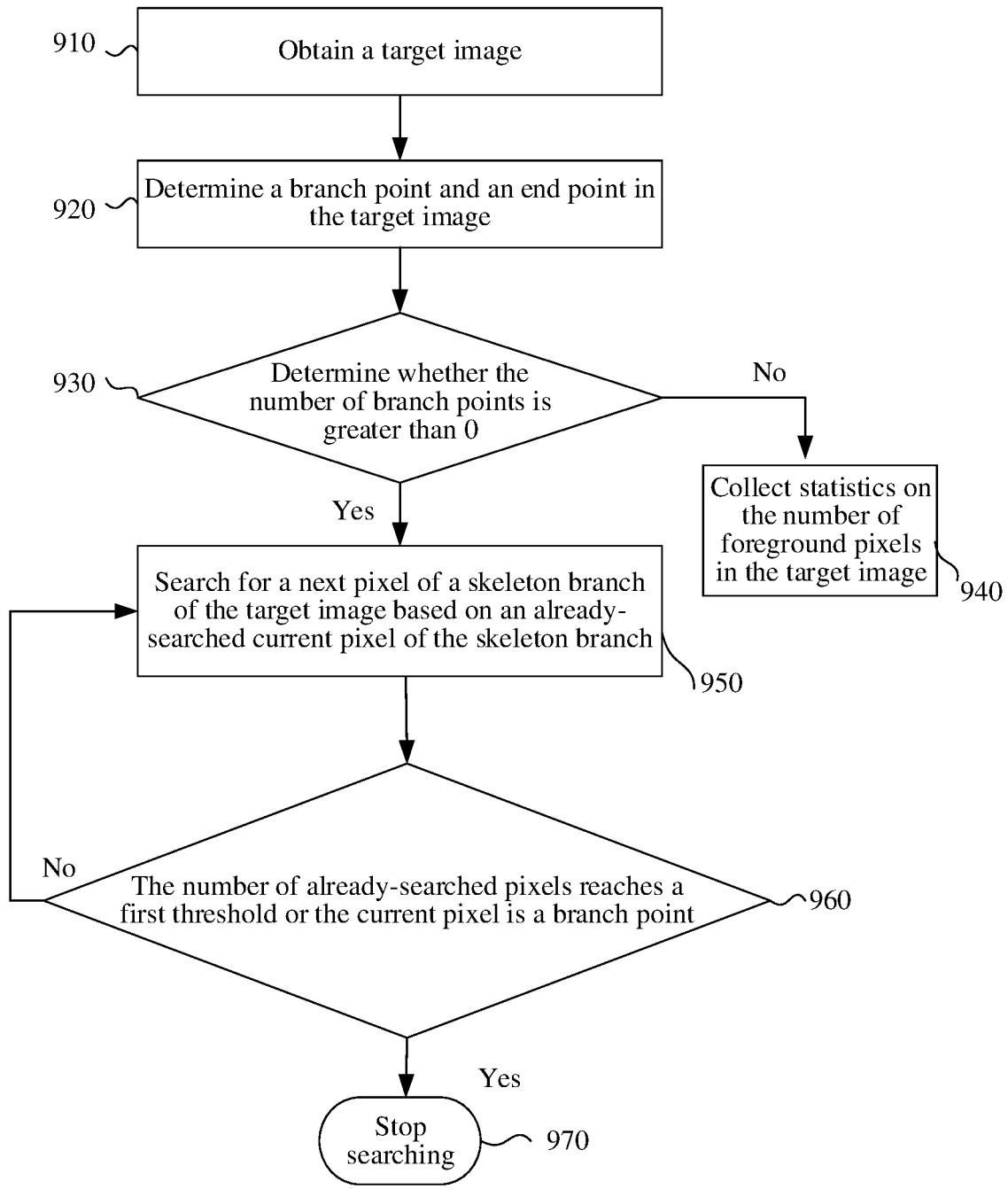
FIG. 9 is a flowchart of a method for determining a burr branch according to an embodiment of this application.

FIG. 9 is a flowchart of a method for determining a burr branch according to an embodiment of this application. As shown in FIG. 9, the method 900 includes the following steps.

Step 910: Obtain a target image.

Optionally, the target image is a processed image of an original picture. The target image is a binarized image. To be specific, a pixel value of a pixel, namely a foreground pixel, of a skeleton branch in the target image is 1; and pixel values of other pixels, namely background pixels, are 0.

Step 920: Determine a branch point and an end point in the target image.

Specifically, for a method for determining a branch point and an end point in the target image, reference may be made to content related to FIG. 3 to FIG. 8, and details are not repeated herein.

Step 930: Determine whether the number of branch points in the target image is greater than 0. If the number of branch points is not greater than 0, step 940 is performed; or if the number of branch points in the target image is greater than 0, step 950 is performed.

Step 940: Collect statistics on the number of foreground pixels in the target image.

Step 950: Search for a next pixel of a skeleton branch of the target image based on an already-searched current pixel of the skeleton branch.

Step 960: Determine whether the number of already-searched pixels reaches a first threshold or whether the current pixel is a branch point. If the number of already-searched pixels reaches the first threshold or the current pixel is a branch point, step 970 is performed; or if the number of already-searched pixels does not reach the first threshold or the current pixel is not a branch point, step 950 is performed.

Step 970: Stop searching.

Optionally, stopping searching may be stopping search for a next pixel on the skeleton branch.

Optionally, in a case that all skeleton branches of the target image meet conditions in step 960, stopping searching may be stopping search for next pixels of all skeleton branches of the target image.

Optionally, in an embodiment of this application, the method 100 further includes: obtaining an input image, where a value of a foreground pixel of the input image corresponds to 1, and a value of a background pixel corresponds to 0; and extracting a connected component of the input image to obtain at least one target image, where each of the target images includes one connected component of the input image.

Figure 10:
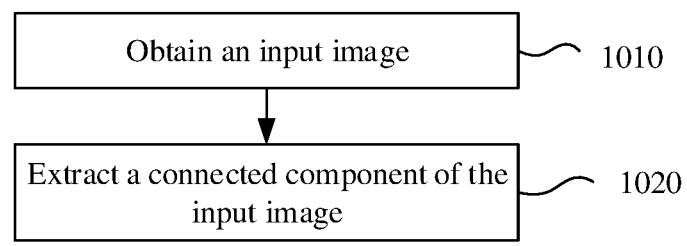
FIG. 10 is a schematic diagram of an image processing method according to an embodiment of this application.

FIG. 10 is a schematic diagram of an image processing method according to an embodiment of this application. As shown in FIG. 10, the method includes the following steps.

Step 1010: Obtain an input image.

The input image may be an image obtained through binarization processing on an original picture. A value of a foreground pixel of the input image is 1, and a value of a background pixel is 0.

Step 1020: Extract a connected component of the input image.

The connected component, also referred to as a connected region, is generally an image region formed by adjacent foreground pixels with a same pixel value in an image.

Optionally, step 1020 may be performed before step 910.

Figure 11:
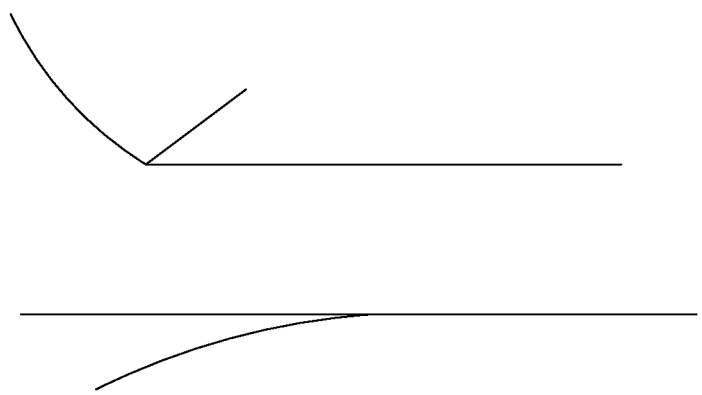
FIG. 11 is a schematic diagram of an input image according to an embodiment of this application.
Figure 12:
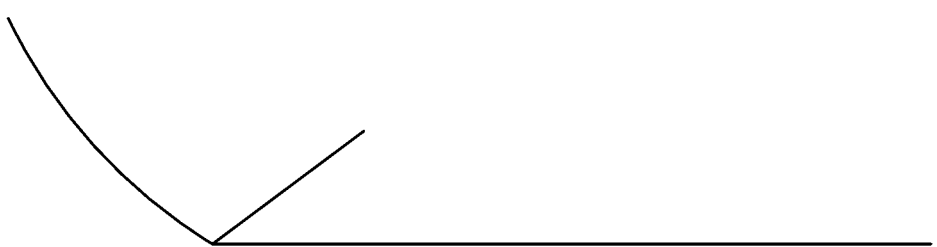
FIG. 12 and FIG. 13 are schematic diagrams after extraction of connected components of an input image according to an embodiment of this application.
Figure 13:

FIG. 11 is a schematic diagram of an input image according to an embodiment of this application, and FIG. 12 and FIG. 13 are schematic diagrams after extraction of connected components from the input image according to an embodiment of this application. As shown in FIG. 11, the input image includes two connected regions. After the connected components are extracted, images shown in FIG. 12 and FIG. 13 can be obtained, where each connected component may correspond to one target image. The connected component may be extracted using a two-pass method, a seed filling algorithm, or the like, which is not specifically limited in this embodiment of this application.

In this embodiment, each target image corresponds to one connected component, and each target image is processed separately, which helps improve the processing speed in the method.

Optionally, in an embodiment of this application, a width of the skeleton branch is a single-pixel width. In this way, it can be ensured that during search for a next pixel of the skeleton branch, only one neighboring pixel is present along a direction of the skeleton, so as to ensure uniqueness of a skeleton path.

The method embodiments of this application have been described in detail above with reference to FIG. 1 to FIG. 13, and the embodiments of the image processing apparatus of this application are described in detail below. It should be understood that the method embodiments correspond to the apparatus embodiments. For similar descriptions, refer to the method embodiments.

Figure 14:
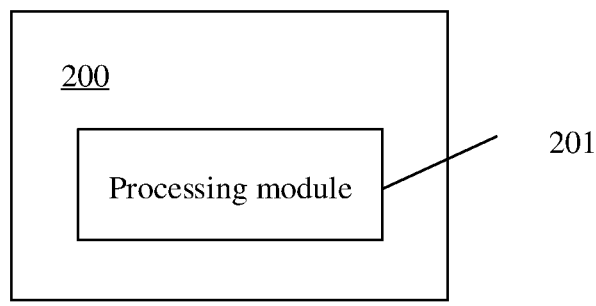
FIG. 14 is a schematic diagram of an image processing apparatus according to an embodiment of this application.

FIG. 14 is a schematic diagram of an image processing apparatus according to an embodiment of this application. As shown in FIG. 14, the image processing apparatus 200 includes a processing module 201. The processing module 201 is configured to search for a next pixel of a skeleton branch of a target image based on an already-searched current pixel of the skeleton branch; and determine, based on the number of already-searched pixels of the skeleton branch, whether the skeleton branch is a burr branch.

Optionally, in an embodiment of this application, the processing module 201 is configured to: before the next pixel of the skeleton branch of the target image is searched for based on the already-searched current pixel of the skeleton branch, determine an end point and a branch point in the target image, where the end point and the branch point are used for searching for the skeleton branch.

Optionally, in an embodiment of this application, the processing module 201 is configured to: use an end point in the target image as an anchor point, and sequentially search for a next pixel of the skeleton branch based on an already-searched current pixel of the skeleton branch corresponding to the end point.

Optionally, in an embodiment of this application, the processing module 201 is configured to: in a case that the number of already-searched pixels of the skeleton branch reaches a first threshold, determine that the skeleton branch is not a burr branch.

Optionally, in an embodiment of this application, the processing module 201 is configured to: in a case that the number of already-searched pixels of the skeleton branch does not reach the first threshold and the already-searched current pixel of the skeleton branch is a branch point, determine that the skeleton branch is a burr branch.

Optionally, in an embodiment of this application, the processing module 201 is configured to: stop searching in a case that the number of already-searched pixels of the skeleton branch reaches the first threshold or that the already-searched current pixel of the skeleton branch is a branch point.

Optionally, in an embodiment of this application, the processing module 201 is configured to: convert a value of the already-searched current pixel to 0; and in a case that only one foreground pixel is present in eight neighboring pixels of the already-searched current pixel, determine that the one foreground pixel is a next pixel of the skeleton branch.

Optionally, in an embodiment of this application, the processing module 201 is configured to: in a case that more than one foreground pixel is present in the eight neighboring pixels of the already-searched current pixel, determine that the already-searched current pixel is a branch point.

Optionally, in an embodiment of this application, the processing module 201 is configured to: record the already-searched current pixel, where the number of recorded pixels is the number of already-searched pixels of the skeleton branch.

Optionally, in an embodiment of this application, the processing module 201 is configured to: store position information of the already-searched current pixel into a memory.

Optionally, in an embodiment of this application, the processing module 201 is configured to: in a case that the skeleton branch is determined to be a burr branch, convert a value of an already-searched current branch point to 1; and/or, in a case that the skeleton branch is determined not to be a burr branch, convert values of all already-searched pixels of the skeleton branch to 1.

Optionally, in an embodiment of this application, the processing module 201 is configured to: based on values of the eight neighboring pixels of the current pixel in the target image, determine that the current pixel in the target image is an end point or a branch point.

Optionally, in an embodiment of this application, the processing module 201 is configured to: in a case that a sum of the values of the eight neighboring pixels of the current pixel in the target image is 1, determine that the current pixel is an end point.

Optionally, in an embodiment of this application, the processing module 201 is configured to: in a case that a sum of the values of the eight neighboring pixels of the current pixel in the target image is greater than or equal to 3 and values of at least three of the eight neighboring pixels each are less than or greater than a value of a previous neighboring pixel in a clockwise or counterclockwise direction by 1, determine that the current pixel is a branch point.

Optionally, in an embodiment of this application, the processing module 201 is configured to: in a case that the number of branch points is 0, determine, based on the number of foreground pixels of the skeleton branch, whether the skeleton branch is a burr branch.

Optionally, in an embodiment of this application, the processing module 201 is configured to: in a case that the number of foreground pixels of the skeleton branch is less than the first threshold, determine that the skeleton branch is a burr branch; or in a case that the number of foreground pixels of the skeleton branch is not less than the first threshold, determine that the skeleton branch is not a burr branch.

Optionally, in an embodiment of this application, the processing module 201 is configured to: obtain an input image, where a value of a foreground pixel of the input image corresponds to 1, and a value of a background pixel corresponds to 0; and extract a connected component of the input image to obtain at least one target image, where each of the target images includes one connected component of the input image.

Figure 15:
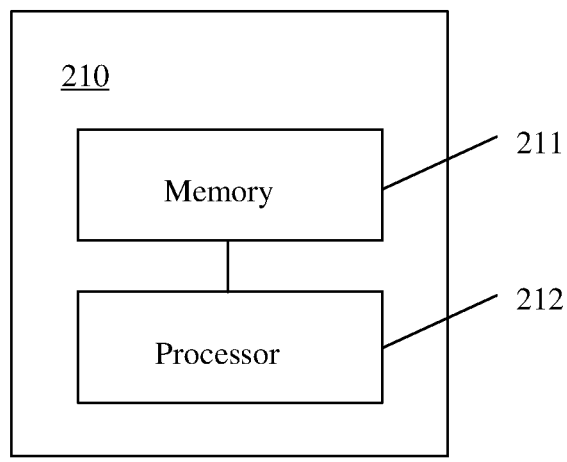
FIG. 15 is a schematic diagram of an image processing apparatus according to an embodiment of this application.

FIG. 15 is a schematic diagram of an image processing apparatus according to an embodiment of this application. As shown in FIG. 15, an embodiment of this application provides an image processing apparatus 210, including a memory 211 and a processor 212. The memory 211 is configured to store computer-executable instructions; and the processor 212 is configured to access the memory and execute the computer-executable instructions, so as to perform operations in the image processing method in any one of the foregoing embodiments.

The processor 212 in this embodiment of this application may be an integrated circuit chip with a signal processing capability. During implementation, the steps of the method embodiments may be implemented by an integrated logical circuit of hardware in the processor, or by a software instruction. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or transistor logical device, or a discrete hardware component, and may implement or execute methods and steps disclosed in the embodiments of this application. The general-purpose processor may be a microprocessor or any regular processor. The steps of the methods disclosed with reference to the embodiments of this application may be directly implemented by a hardware decoding processor, or may be implemented by a combination of hardware and a software module in a decoding processor. The software module may be located in a storage medium that is mature in the art, such as a random access memory, a flash memory, a read-only memory, a programmable read-only memory, or an electrically erasable programmable memory, or a register. The storage medium is located in the memory. The processor reads information in the memory and completes the steps of the foregoing method with reference to hardware of the processor.

The memory 211 in this embodiment of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and serves as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DR RAM). It should be noted that the memory in the system and method described in this specification is intended to include but is not limited to these and any other suitable types of memories.

An embodiment of this application provides a storage medium configured to store a computer program, and when the computer program is executed by a computing device, the computing device implements the method described in any one of the foregoing embodiments.

Although this application has been described with reference to some embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. An image processing method, comprising:
    searching for a next pixel of a skeleton branch of a target image based on an already-searched current pixel of the skeleton branch;
    determining, based on a number of already-searched pixels of the skeleton branch, whether the skeleton branch is a burr branch; and
    stopping searching in response to the number of the already-searched pixels of the skeleton branch reaching a threshold or that the already-searched current pixel of the skeleton branch is a branch point.

2. The method according to claim 1, further comprising, before searching for the next pixel of the skeleton branch of the target image based on the already-searched current pixel of the skeleton branch:
    determining an end point and a branch point in the target image, wherein the end point and the branch point are used for searching for the skeleton branch.

3. The method according to claim 2, wherein searching for the next pixel of the skeleton branch of the target image based on the already-searched current pixel of the skeleton branch comprises:
    searching for the next pixel of the skeleton branch based on the already-searched current pixel of the skeleton branch corresponding to an end point in the target image used as an anchor point.

4. The method according to claim 2, wherein determining the end point and the branch point in the target image comprises:

based on values of eight neighboring pixels of the current pixel in the target image, determining whether the current pixel in the target image is the end point or the branch point.

5. The method according to claim 4, wherein determining whether the current pixel in the target image is the end point or the branch point comprises:
in response to a sum of the values of the eight neighboring pixels of the current pixel in the target image being 1, determining that the current pixel is the end point.

6. The method according to claim 4, wherein determining whether the current pixel in the target image is the end point or the branch point comprises:
in response to a sum of the values of the eight neighboring pixels of the current pixel in the target image being greater than or equal to 3 and values of at least three of the eight neighboring pixels are each less than or greater than a value of a previous neighboring pixel in a clockwise or counterclockwise direction by 1, determining that the current pixel is the branch point.

7. The method according to claim 2, further comprising:
in response to a number of branch points being 0, determining, based on a number of foreground pixels of the skeleton branch, whether the skeleton branch is a burr branch.

8. The method according to claim 7, wherein determining, based on the number of the foreground pixels of the skeleton branch, whether the skeleton branch is a burr branch comprises:
in response to the number of the foreground pixels of the skeleton branch being less than a threshold, determining that the skeleton branch is a burr branch; or
in response to the number of the foreground pixels of the skeleton branch being not less than the threshold, determining that the skeleton branch is not a burr branch.

9. The method according to claim 1, wherein determining, based on the number of the already-searched pixels of the skeleton branch, whether the skeleton branch is a burr branch comprises:
in response to the number of the already-searched pixels of the skeleton branch reaching a threshold, determining that the skeleton branch is not a burr branch.

10. The method according to claim 1, wherein determining, based on the number of the already-searched pixels of the skeleton branch, whether the skeleton branch is a burr branch comprises:
in response to the number of the already-searched pixels of the skeleton branch not reaching a threshold and the already-searched current pixel of the skeleton branch is a branch point, determining that the skeleton branch is a burr branch.

11. The method according to claim 1, wherein a value of a foreground pixel in the target image corresponds to 1, and a value of a background pixel corresponds to 0.

12. The method according to claim 11, wherein searching for the next pixel of the skeleton branch of the target image based on the already-searched current pixel of the skeleton branch comprises:
converting a value of the already-searched current pixel to 0; and
in response to only one foreground pixel being present in eight neighboring pixels of the already-searched current pixel, determining that the one foreground pixel is the next pixel of the skeleton branch.

13. The method according to claim 12, further comprising:
in response to more than one foreground pixel being present in the eight neighboring pixels of the already-searched current pixel, determining that the already-searched current pixel is a branch point.

14. The method according to claim 12, further comprising:
recording the already-searched current pixel, wherein a number of recorded pixels is the number of the already-searched pixels of the skeleton branch.

15. The method according to claim 14, wherein recording the already-searched current pixel comprises:
storing position information of the already-searched current pixel into a memory.

16. The method according to claim 12, further comprising:
in response to the skeleton branch being determined to be a burr branch, converting a value of an already-searched current branch point to 1; or
in response to the skeleton branch being determined not to be a burr branch, converting values of all the already-searched pixels of the skeleton branch to 1.

17. The method according to claim 1, further comprising:
obtaining an input image, wherein a value of a foreground pixel of the input image corresponds to 1, and a value of a background pixel corresponds to 0; and
extracting at least one connected component of the input image to obtain at least one target image, wherein each of the at least one target image comprises one of the at least one connected component of the input image.

18. The method according to claim 1, wherein a width of the skeleton branch is a single-pixel width.

19. An image processing apparatus, comprising:
a memory, storing computer executable instructions; and
a processor, configured to access the memory and execute the computer-executable instructions to:
search for a next pixel of a skeleton branch of a target image based on an already-searched current pixel of the skeleton branch;
determine, based on a number of already-searched pixels of the skeleton branch, whether the skeleton branch is a burr branch; and
stop searching in response to the number of the already-searched pixels of the skeleton branch reaching a threshold or that the already-searched current pixel of the skeleton branch is a branch point.

20. An image processing method, comprising:
searching for a next pixel of a skeleton branch of a target image based on an already-searched current pixel of the skeleton branch, comprising:
converting a value of the already-searched current pixel to a value representing a background pixel; and
in response to only one foreground pixel being present in eight neighboring pixels of the already-searched current pixel, determining that the one foreground pixel is the next pixel of the skeleton branch; and
determining, based on a number of already-searched pixels of the skeleton branch, whether the skeleton branch is a burr branch.

* * * * *